United States Patent [19]
Dickinson

[11] Patent Number: 5,673,123
[45] Date of Patent: Sep. 30, 1997

[54] METHODS AND MEANS FOR PROCESSING IMAGES

[75] Inventor: Alexander George Dickinson, Neptune, N.J.

[73] Assignee: Lucent Technologies Inc., Murray Hill, N.J.

[21] Appl. No.: 268,426

[22] Filed: Jun. 30, 1994

[51] Int. Cl.$^6$ .................................................. H04N 1/195
[52] U.S. Cl. ........................... 358/474; 358/404; 358/482
[58] Field of Search ................................. 358/482, 483, 358/404, 440, 442, 468, 474, 443, 447, 448; 379/100; H04N 1/00, 1/21, 1/195

[56] References Cited

U.S. PATENT DOCUMENTS

| | | | |
|---|---|---|---|
| 4,441,125 | 4/1984 | Parkinson | 358/213 |
| 4,942,473 | 7/1990 | Zeeri et al. | 358/213.26 |
| 5,367,596 | 11/1994 | Chow | 358/482 |

*Primary Examiner*—Kim Vu

[57] ABSTRACT

An image of an object, such as message for facsimile transmission, is acquired optically by setting photosensitive cells along a multiplicity of rows and columns of a random access memory to a given value such as 1, exposing the plurality of cells to an image so the cells change electrical values to exposure values, and after a given time, ending the effective exposure by maintaining values in the cells corresponding to the exposure content of the cells. The maintaining involves going in sequence from row to row, and in each row simultaneously reading the cells in the row and, on the basis of the reading, writing refresh values representative of the exposure values back into the read cells of the row, and repeating the row to row sequence cyclically to prevent changes in the cells due to further exposure. The refreshed data is processed by sequentially reading the refresh values of the cells of a column serially from column to column until all the values have been processed. Processing includes transmission, or compression and transmission.

22 Claims, 3 Drawing Sheets

METHODS AND MEANS FOR PROCESSING IMAGES

FIELD OF THE INVENTION

This invention relates to methods and means for processing images, and particularly to a facsimile camera for imaging and transmitting facsimile messages.

BACKGROUND OF THE INVENTION

Fax images are conventionally acquired by mechanically scanning a sheet of paper past a linear array of sensors. This demands mechanical movement of the paper and sensor array relative to each other. Mechanical devices are expensive and difficult to maintain. Paper jams are common. Attempts have been made to overcome the difficulties inherent in mechanically passing paper past a row of sensors by placing random access memories, such as DRAMs, in cameras behind shutters. While this system may be effective, it still depends upon mechanical operation of the shutters. The mechanical devices pose special problems for computers which can send and receive facsimile images but require the extra mechanical facilities to acquire images from a paper source.

SUMMARY OF THE INVENTION

An aspect of the invention involves setting a plurality of photosensitive cells along a multiplicity of rows and columns of a random access memory to a given value, exposing the plurality of cells of the random access memory to an image so the cells change to exposure values on the basis of exposures of the cells, and after a given exposure time maintaining values in the cells corresponding to the exposure content of the cells. The maintaining involves going in sequence from row to row, and in each row simultaneously reading the cells in the row and, on the basis of the reading, writing refresh values representative of the exposure values back into the read cells of the row, and repeating the row to row sequence cyclically.

According to another aspect of the invention, the refreshed values are processed by sequentially reading the refresh values of the cells of a column serially from column to column until all the values have been processed. The processing may take start during the initial refreshing According to another aspect of the invention, the processing involves transmission of the values.

According to another aspect of the invention, the given value is a 1 and the change in exposure values is to intermediate values toward 0.

According to another aspect of the invention, the refresh values are 1 and 0 depending on the closeness of the exposure values to 1 or 0.

These and other aspects of the invention are pointed out in the claims. Objects and advantages of the invention will become evident from the following detailed description when read in light of the accompanying drawings.

DETAILED DESCRIPTION OF PREFERRED EMBODIMENTS

Figure 1:
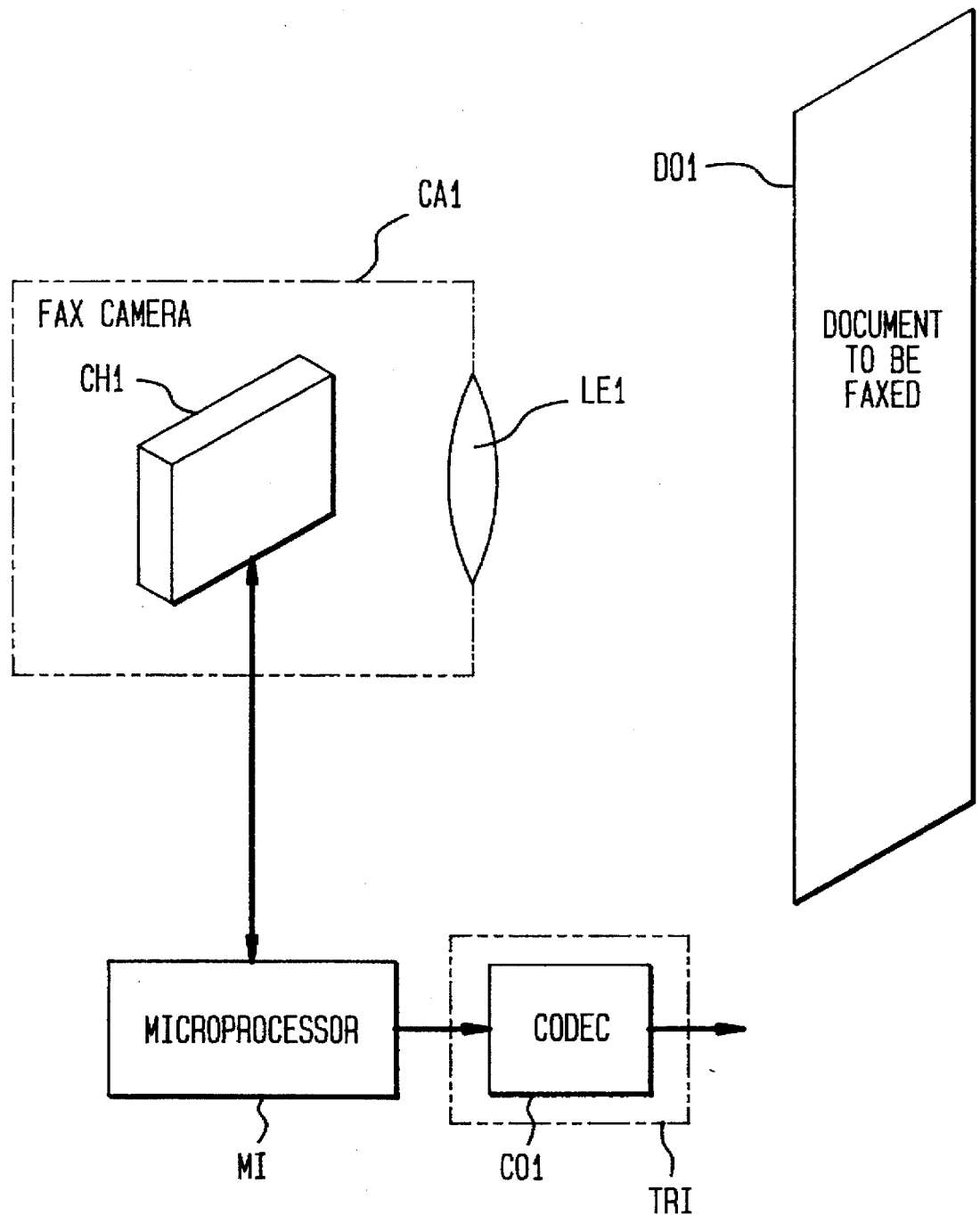
FIG. 1 is a perspective view illustrating a system embodying features of the invention.

FIG. 1 illustrates a fax camera system embodying the invention. Here, an objective lens LE1 of a fax camera CA1 focuses a document DO1 to be faxed onto a DRAM chip CH1. A microprocessor MI1 controls operation of the chip CH1. A transmitter TR1 composed of a codec (coder-decoder) CO1 transmits data collected from the chip CHI by the microprocessor MI1. The codec CO1 also receives incoming fax data for processing by the microprocessor MI1 and display on a monitor (not shown).

Figure 2:
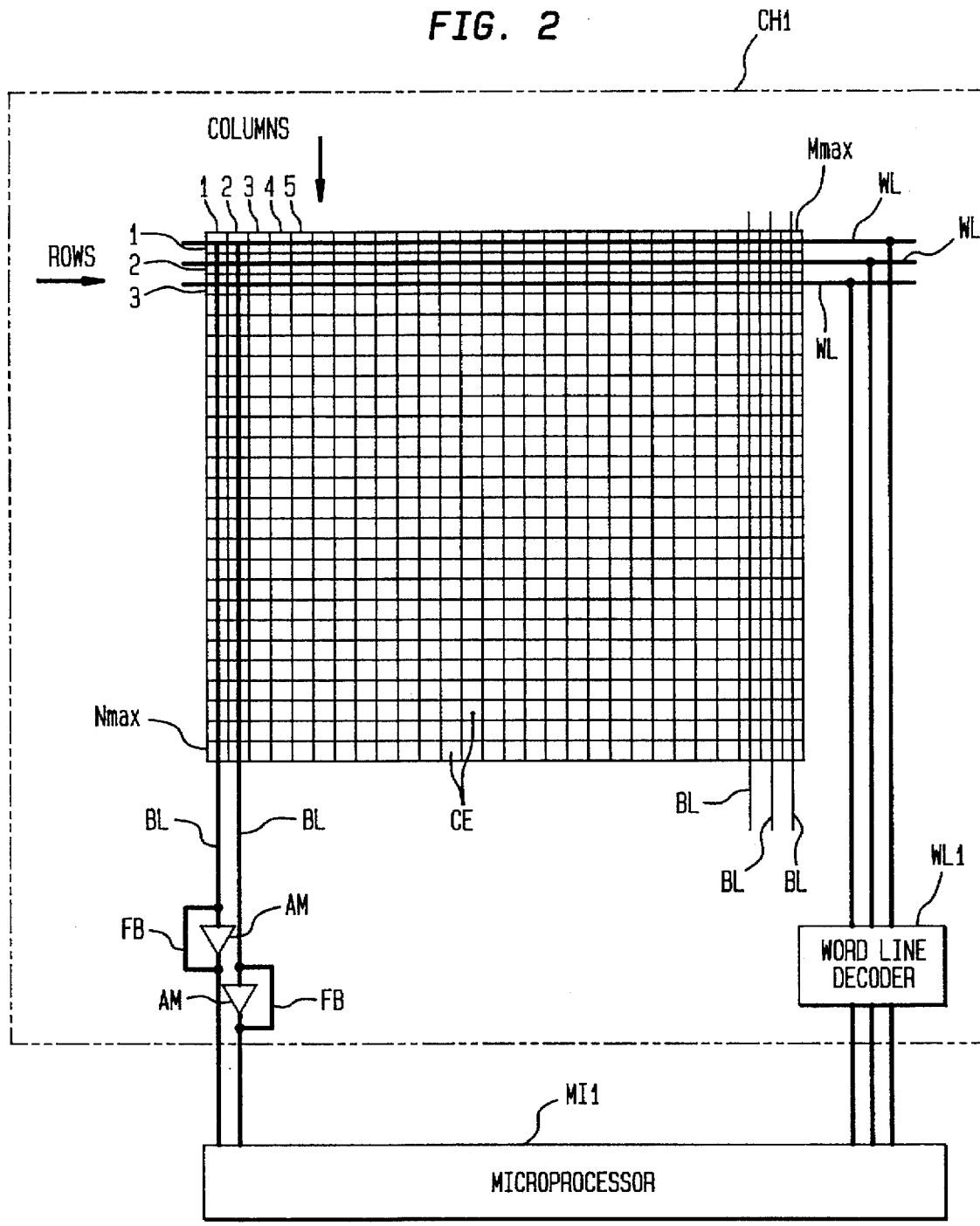
FIG. 2 is a schematic illustration of a chip arrangement of FIG. 1 and embodying features of the invention.

FIG. 2 illustrates details of the chip CH1 with the microprocessor MI1 in FIG. 1. Here, N rows and M columns of cells CE coact with respective word lines WL and bit lines BL connected to the microprocessor MI1. In known manner, the word lines WL and bit lines BL read the content of any cell and write into the cell when the microprocessor places suitable signals simultaneously at the word line and bit line crossing at that cell. That is, placing suitable signals simultaneously at the word line and bit line that crosses at a particular cell allows the word and bit lines to read out the content of the cell or read data into the cell. The chip CH1 includes a standard word line decoder WL1 that converts information from the microprocessor. One of its tasks, according to standard well known procedures is to convert word line addresses from the microprocessor MI1. For simplicity the operation is described as if the microprocessor MI1 operation included the word line decoder WL1.

An amplifier AM forms part of the chip CH1 at the end of each bit line BL. Each amplifier AM contains a highly positive feedback FB. Hence when the microprocessor MI1 reads out any voltage value of any cell on any bit line the amplifier AM feeds a more extreme amplified value, that depends on the readout value, back to the cell being read out. It then writes that amplified feedback value on the cell. The rewritten value is here called the "refresh" value because it refreshes the value in the cell. Amplifiers that refresh, such as amplifiers AM with feedback FB, are well known and described in the book *CMOS Digital Circuit Technology*, by Masakazu Shoji, published by Prentice Hall, Englewood Cliffs, N.J., section 7.24 entitled "Sense Amplifier", pages 337 to 399. When the value of the readout signal is a value between a logic 0 value and a threshold value A, the refresh signal becomes 0. When the value of the readout signal is a value between A and a logic 1, the refresh signal becomes 1. The binary values 0 and 1 are eminently suitable for a facsimile machine.

Figure 3:
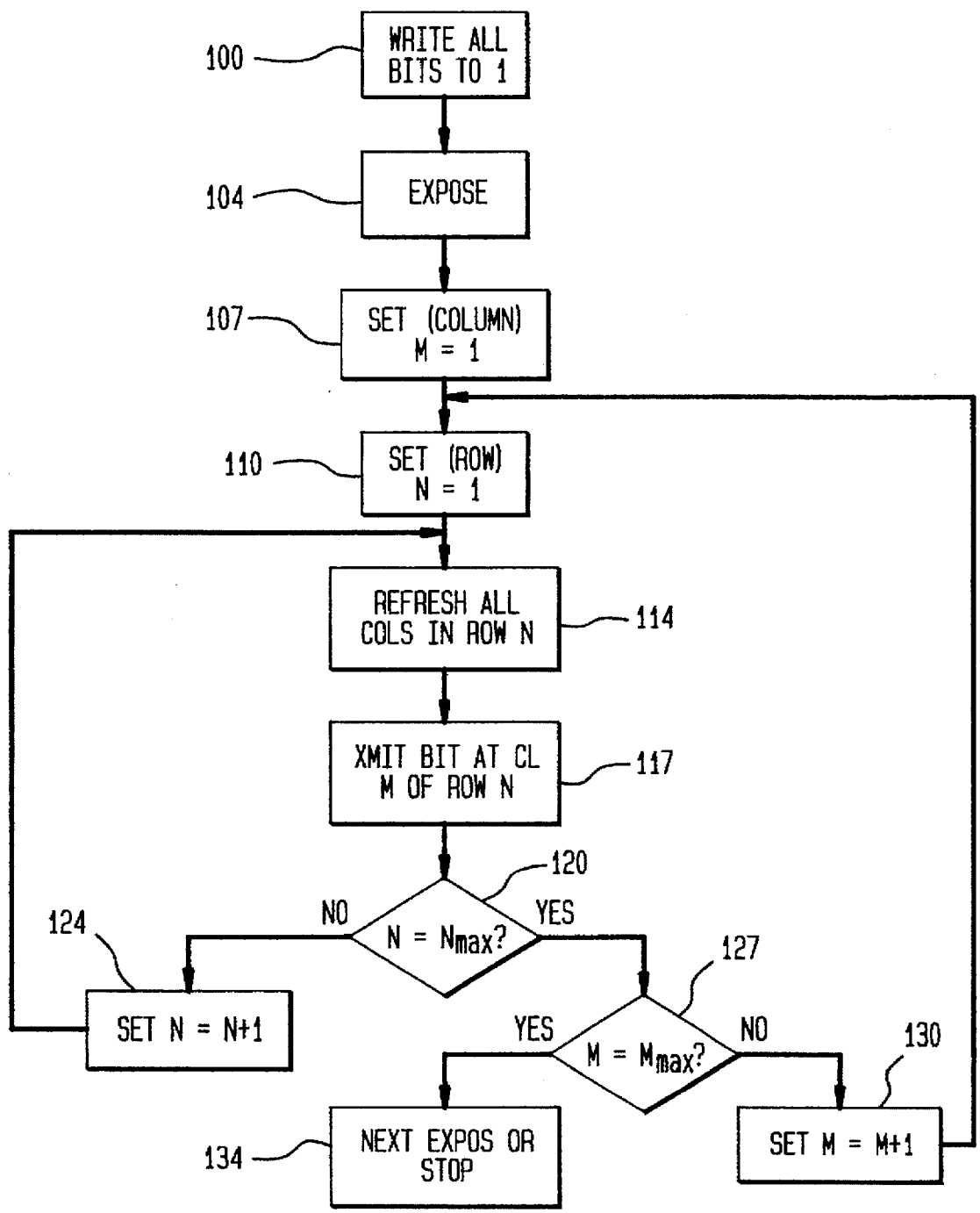
FIG. 3 is a flow chart illustrating an operation the system in FIGS. 1 to 2 and embodying features of the invention.

The microprocessor MI1 operates with the chip according to the flow chart in FIG. 3. Here, the lens LE1 first focuses the document DO1 to be faxed on the chip CH1. The electronic "shutter" of the camera CA1 is now effectively closed. To start the exposure, in step 100, the microprocessor MI1 writes all the bits in row N and column M to voltage equal to a logic 1, and in step 104, allows the exposure to continue for a predetermined time. At the end of the exposure time, the voltage values at the chips have dropped to values between 1 and 0 depending on the amount of light on the cells as determined by the image being acquired by the chip.

In step 107 the camera "shutter" begins closing. Here, the microprocessor MI1 sets the column M to 1, and in step 110 the row N to 1. In step 114, the microprocessor MI1 simultaneously refreshes the values in the cells of all the columns in row N=1. That is, the microprocessor MI1 simultaneously reads all the M columns and row 1. As a result the amplifiers AM in all the M columns feed back the values between logic 0 and A, in any cell of row N=1 to that cell as a logic 0. The amplifiers feed back the values between A and logic 1 in any cell of row N=1 to that cell as a logic 1. At the same time, in step 117, the microprocessor MI1 feeds the refreshed value of the one cell of row N=1 and column M=1 to the codec CO1 for addition of control pulses and transmission of that logic 0 or 1. The coder may also compress and hold the data. The time for the pass through steps 107, 110, 114, 117, and 120 for one row is, for example 100 ns (nanoseconds, $10^{-9}$ seconds).

In step 120, the microprocessor MI1 then determines if the row N is Nmax, i.e. the last row. If it is not, in step 124, it increments the row N to the next row by setting N=N+1. After the first row, this would be the second row. It now goes back to step 114 and repeats the process for the row N=2. That is, the microprocessor MI1 simultaneously reads all the M columns and row N=2. As a result the amplifiers AM in all the M columns feed back the values between logic 0 and A in any cell to the cell of row N=2 as a 0. The amplifiers feed back the values between A and logic 1 in any cell of row N=2 to that cell as a logic 1. At the same time, in step 117, the microprocessor MI1 feeds the refreshed value of the one cell of row N=2 and column M=1 to the transmitter TR1 for transmission of that logic 0 or 1. The time for the pass through steps 124, 114, 117, and 120 for the second row, is for example, 100 ns, the same as for the first row.

The microprocessor MI1 then again advances to step 120 to determine if the row N is Nmax, i.e. the last row. If it is not it loops again to step 114 to increment the row to the next row by setting N=N+1. It repeats the reading, refreshing, transmission, and determination passage of steps 114, 117, and 120 and 124 for all rows up to N=Nmax.

The time for each pass through steps 124, 114, 117, and 120 for each row is, for example 100 ns the same as for the previous rows. The time for the entire cycle for all rows up to N=Nmax is about 100 ms per row. For 2000 rows this is 200 μs (microseconds, $10^{-6}$ seconds). During this short time the values in all the cells of remain the same 0 or 1 because the intermediate continued time of exposure to light during this 200 μs is insufficient to cause departure from the logic 1 or 0 to the value A. Thus the repeated looping of steps 124, 114, 117, and 120 freezes the values of all the cells in all the rows in the chip CH1, i.e., it "closes" the "shutter" during the cycle of reading and writing of rows N=1 to N=Nmax.

When N=Nmax, in step 127, the microprocessor MI1 asks if this is the last column M=Mmax. If not, in step 130, it increments the column by setting M=M+1 and forms a second loop that encompasses the first. It repeats the incrementing, reading, refreshing, and transmitting operation of steps 124, 114, 117, and 120 Nmax times in Nmax loops from row N=1 to row N=Nmax for a complete cycle. At the end of each cycle when step 120 responds yes to N=Nmax?, it asks again, in step 127, whether M=Mmax. If no, it repeats other cycles each from N=1 to N=Nmax until it gets a yes in step 127. At this point the microprocessor MI1 has transmitted all the refreshed values in all columns M=1 to M=Mmax.

During the passage of cycles from M=1 to M=Mmax, the microprocessor MI1 has continuously constrained refreshment of the cells in each row. This constant reading and refreshment within the 200 μs pass from N=1 to N=Nmax in each cycle has effectively kept the "shutter" "closed" to the effects of additional exposure. The shutter has thus remained closed from the beginning of the first 200 μs cycle when N=1 and M=1, to the end of the last 200 μs cycle at N=Nmax and M=Mmax. For 2000 columns, this is a time of 200 μs×2000 columns=400 ms (milliseconds, $10^{-3}$ seconds). Thus the microprocessor MI1 reads out the entire binary image content of a 2000 by 2000 cell chip is for transmission, in 0.4 seconds.

At this point, in step 127, the microprocessor MI1 indicates that M=Mmax. It goes to step 134 to go to the next exposure at step 100 by setting all bits to 1 or to stop operation.

The transmission need not occur at the very start of the refreshing pass in step 117. According to an embodiment of the invention, it starts any time after refreshment. However, the refreshment cycle must continue until the refreshed content of all cells has been transmitted. That is the "shutter" must remain "closed" during readout for transmission. Closing the "shutter" means continuing the cycle of the two loops from N=1 to N=Nmax and from M=1 M=Mmax.

The invention avoids acquiring images by mechanically scanning the sheet of paper past a linear array of sensors. The invention uses a single CMOS chip high definition electronic camera to take a "snapshot" of the sheet. Such a camera is advantageous because it need only acquire a binary image rather than the gray-scale typically required of an electronic imaging device. Another embodiment of the invention involves adding the fax acquisition of FIGS. 1 to 3 to regular telephones (the camera could be in the handpiece) and cellular telephones (allowing users to fax from anywhere). Many such computers can add in the fax camera to a personal computer. Many such computers can send and receive faxes, but few can acquire the fax image from an external paper source. With the addition of a fax camera embodying the invention, they can scan in documents both for faxing and optical character recognition. Similarly the invention offers considerable extra functionality to a personal digital assistant. Its integrated nature, and the possibility of using single element injection modeled plastic lenses, makes the cost of the fax camera low.

The DRAM is used by first writing a "1" to all locations and then exposing the DRAM to light. If more light falls on some locations than others, those locations may go to "0" due to charge leakage. If the memory is then read according to the invention, it shows a binary representation of an image. The chip contains single large array of Cells (or pixels). For a Group 3 fax an array of about 2000 by 2000 pixels achieves the required definition.

The array is used for imaging by first writing all cells to a high ("1") value. After a certain (integration or exposure) time has elapsed, the memory is accessed. Cells that have received more light will now be clear ("0") as opposed to the other cells that will retain their high ("1") value.

According to an embodiment of the invention, the codec CO1 also compresses the data from the microprocessor before transmitting it.

The invention avoids the long time required for reading out all 4 million pixels sequentially. In fact it would be impractical to perform a sequential readout of 4 million pixels because while earlier pixels are being read, others are still exposed to the light and will continue to clear. The invention uses a form of electronic "shuttering". Immediately after the integration time is complete, the invention causes the chip to enter a "refresh" mode where it accesses each row by connecting a row of cells to their respective bit lines. The sense amplifiers AM attached to the bit lines read the value of the cells, and write it back—in effect refreshing the location before further light can cause it to clear. This refresh mode has the same effect as a shutter being closed over the imager as long as the time between refreshes is much less than the optical integration time.

Once the refresh mode is in action the structure embodying the invention reads the array out at leisure. According to an embodiment of the invention, the readout feeds the data into an on-chip compression circuit before transmission.

While embodiments of the invention have been described in detail, it will be evident to those skilled in the art that the invention may be embodied otherwise without departing from its spirit and scope.

What is claimed is:

1. A method of converting an image of an object data and transmitting the data, comprising:

setting a plurality of photosensitive cells along a multiplicity of rows and columns of a random access memory to a given value;

exposing the plurality of cells of the random access memory to an image so the cells change to exposure values on the basis of exposures of the cells;

in sequence from row to row, simultaneously reading the cells along each row and, on the basis of the reading, writing refresh values representative of the exposure values back into the read cells;

repeating the row to row reading and writing of refresh values cyclically, and sequentially transmitting the refresh value in each cell;

the step of writing refresh values representative of the exposure values into the read cells including writing the refresh values into all the cells in a row for each transmission of the refresh value in one cell so that all the cells in each row are refreshed each time a single cell is transmitted;

the step of exposing the plurality of cells of the random access memory to an image includes forming an image of the entire object on the random access memory.

2. A method as in claim 1, wherein the step of sequentially transmitting includes transmitting the refresh values of the cells of a column in series from column to column until all the values have been transmitted.

3. A method as in claim 2, wherein the transmitting starts during the refreshing of the cells.

4. A method as in claim 2, the transmitting step includes coding the refresh values.

5. A method as in claim 2, wherein the transmitting step includes compressing the refresh values.

6. A method as in claim 1, wherein the given value is a 1 and the change in exposure values is to intermediate values toward 0.

7. A method as in claim 6, wherein the refresh values are 1 and 0 depending on the closeness of the exposure values to 1 or 0.

8. A method as in claim 1, the exposure step includes focusing the image of the object on the memory with a lens in a camera body.

9. A method as in claim 1, wherein writing the refresh values includes amplifying and positively feeding back the exposure values.

10. A method as in claim 2, wherein writing the refresh values includes amplifying and positively feeding back the exposure values.

11. An apparatus for converting an image of an object to data and transmitting the data, comprising:

a random access memory having a plurality of photosensitive cells along a multiplicity of rows and columns;

means for driving said cells to an electrically given value;

means for exposing the plurality of cells to an image so the cells change to exposure values on the basis of exposures of the cells;

means for operating in sequence from row to row, and simultaneously reading the cells along each row and, on the basis of the reading, writing refresh values representative of the exposure values back into the read cells, and a transmitter for sequentially transmission of the refresh value in each cell;

the means for writing refresh values representative of the exposure values into the read cells including writing the refresh values into all the cells in a row for each transmission of the refresh value in one cell so that all the cells in each row are refreshed each time a single cell is transmitted;

said means for exposing the plurality of cells to an image forms an image of the entire object on the random access memory.

12. An apparatus as in claim 11, wherein said transmitter transmits the refresh values of the cells of a column in series from column to column until all the values have been transmitted.

13. An apparatus as in claim 12, wherein said transmitter includes a codec for transmitting the acquired values.

14. An apparatus as in claim 12, wherein said transmitter includes means for compressing the acquired data.

15. An apparatus as in claim 14, wherein the refresh values are 1 and 0 depending on the closeness of the exposure values to 1 or 0.

16. An apparatus as in claim 12, wherein the means for reading and writing the refresh values includes means connected to the columns for amplifying and feeding back the amplified output.

17. An apparatus as in claim 11, wherein the given value is a 1 and the change in exposure values is to intermediate values toward 0.

18. A method as in claim 12, wherein the transmitter starts transmitting during the refreshing of the cells.

19. An apparatus as in claim 11, wherein said means for exposing includes a lens positioned to focus the entire image of the object on the document.

20. An apparatus as in claim 11, wherein the means for reading and writing the refresh values includes means connected to the columns for amplifying and feeding back the amplified output.

21. An apparatus as in claim 20, wherein said transmitter transmits the refresh values of the cells of a column in series from column to column until all the values have been transmitted.

22. An apparatus as in claim 11, wherein said means for exposing includes a lens positioned to focus the image of the entire object on the cells, and a camera body holding said lens.

* * * * *